United States Patent [19]

Meinke et al.

[11] 3,891,319

[45] June 24, 1975

[54] RECEIVER FOR IMPULSE-SHAPED LIGHT SIGNALS

[75] Inventors: Hans Heinrich Meinke, Gauting; Gerhard Flachenecker; Friedrich Landstorfer, both of Munich; Heinz Lindenmeier, Planegg; Karl Fastenmeier, Munich, all of Germany

[73] Assignee: Eltro GmbH Gesellschaft Fuer Strahlung Stechnik, Heidelberg, Germany

[22] Filed: Jan. 14, 1974

[21] Appl. No.: 433,383

[30] Foreign Application Priority Data

Jan. 16, 1973 Germany ............................ 2301945

[52] U.S. Cl. .................... 356/5; 330/149; 324/131; 343/13

[51] Int. Cl. ............................ G01c 3/08; H03f 1/26

[58] Field of Search ..... 325/473; 324/131; 330/134, 330/138, 149; 356/5; 343/13

[56] References Cited

UNITED STATES PATENTS 3,516,751 6/1970 Fruengel ................................ 356/4

*Primary Examiner*—Maynard R. Wilbur
*Assistant Examiner*—S. C. Buczinski
*Attorney, Agent, or Firm*—Waters, Schwartz & Nissen

[57] ABSTRACT

A receiver for impulse-shaped light signals, in which the time interval between successive light signals is considerably larger than the time duration of the individual light signals, and in which the interference voltages or static generated at the output of the receiver is reduced through the intermediary of a zero-point suppressor, and in which the then remaining disturbance impulses are adjusted to a particular prescribed value through a sensitivity control arrangement and/or amplifying control arrangement. The receiver includes a further, more rapid control sequence in addition to the above-mentioned control sequence, whose control voltage is obtained from the output voltages of the receiver prior to the zero-point suppression.

15 Claims, 2 Drawing Figures

RECEIVER FOR IMPULSE-SHAPED LIGHT SIGNALS

FIELD OF THE INVENTION

The present invention relates to a receiver for impulse-shaped light signals, in which the time interval between successive light signals is considerably larger than the time duration of the individual light signals, and in which the interference voltages or static generated at the output of the receiver is reduced through the intermediary of a zero-point suppressor, and in which the then remaining disturbance impulses are adjusted to a particular prescribed value through a sensitivity control arrangement and/or amplifying control arrangement.

In cases of practical applications, such light signals may be either individual rectangularly-formed progressive light impulses or a group of rapidly sequentially following light impulses of short total duration, as may for example occur when a terrain is illuminated with the light-flash of a laser beam and in which various objects located at different distances reflect light impulses. It is decisive for the application of the present invention that the total time of the group of light impulses received by the receiver be considerably smaller than the time which passes subsequently until the next signal group is received by the receiver. In addition to these signals there are also present interference voltages or static in the receiver, which are either the electronic noises of the amplifier or the electronic noises of a light-sensitive converter (for example, a photodiode), or static from outer space (for example, stray light, thermal rays, foreign light sources). When the receiver is constructed for impulse-shaped signals, meaning in effect, that it does not amplify very low frequencies, these disturbances appear also at the output of the receiver in impulse-shapes. It is known that, with respect to impulse-shaped disturbances, all disturbance impulses whose magnitude does not exceed a predetermined minimum magnitude may be divided out by means of a so-called null-point suppressor. Consequently, the number of remaining disturbance impulses is lessened, and the signal becomes more recognizable when the magnitude of the signal impulses exceeds the above-mentioned minimum magnitude.

SUMMARY OF THE INVENTION

It is an object of the invention to provide a receiver for impulse-shaped light signals incorporating zero-point suppression for reducing static or interference voltages at the output of the receiver, the remaining disturbance impulses being adjusted to a predetermined level by sensitivity control and/or amplifying control arrangements, and which includes a further, more rapid control sequence in addition to the above-mentioned control sequence, whose control voltage is obtained from the output voltages of the receiver prior to the zero-point suppression.

DETAILED DESCRIPTION

Figure 1:
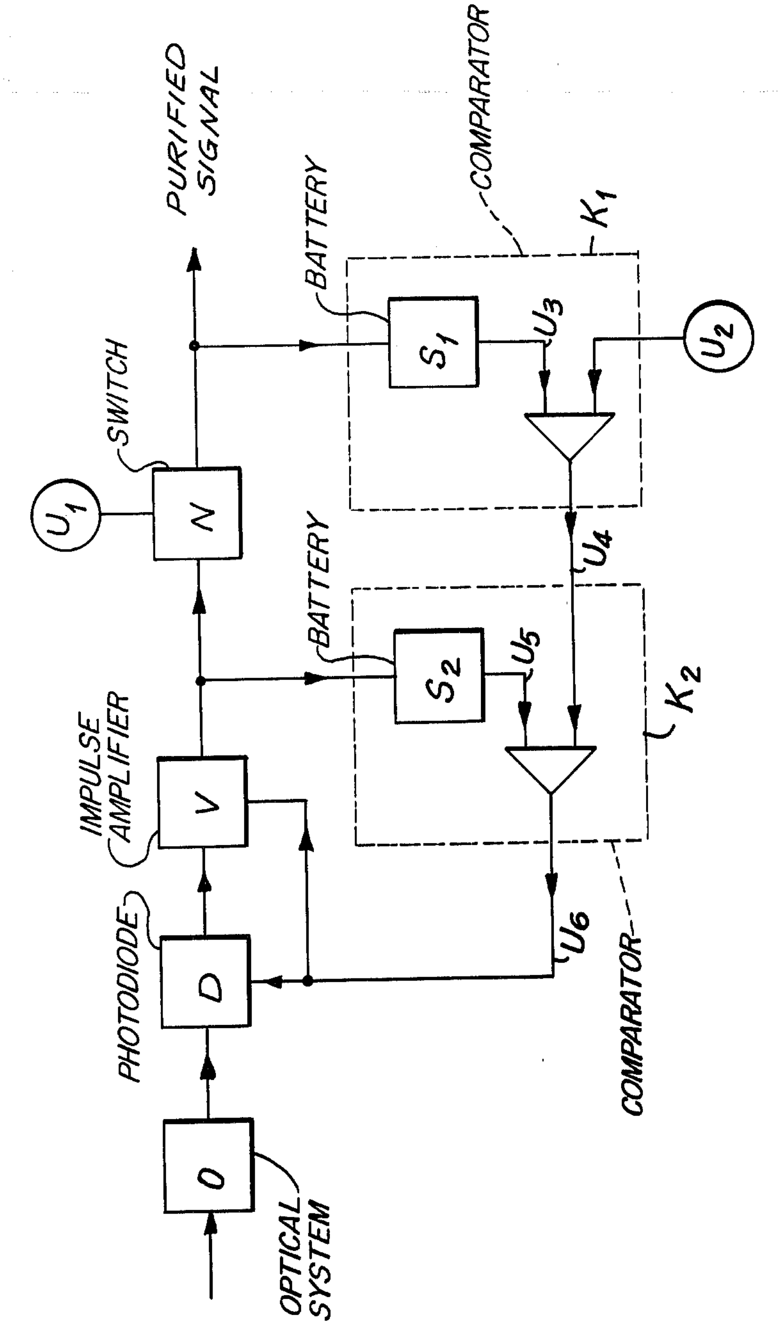
FIG. 1 is a block diagram of a receiver circuit according to the present invention.

Referring to the drawing, FIG. 1 illustrates an example of a receiver arrangement. The light signal falls onto a photodiode D through an optical system O, and in which the diode conveys a corresponding electrical signal to an impulse amplifier V. At the output of the amplifier there is located a switch arrangement or circuit N adapted for suppression of the null-point, and which suppresses all voltages which are lower than a reference voltage $U_1$. This switch N may assume, in a known manner, an impulse regeneration, in effect, giving out all output impulses in rectangular shape and, if required, with all of the impulses being of equal magnitude. At the output of the switch arrangement N there is consequently provided a purified signal. It is further known that the sensitivity of the light-sensitive element or photodiode D, or the amplification of the amplifier is regulated, and preferably in a manner so that the disturbance impulses within the purified signal are adjusted to a predetermined magnitude. For example, the number of disturbance impulses for each unit of time may be prescribed and adjusted through the regulating. This occurs, in the example of FIG. 1, through the intermediary of the comparator K1 in which the prescribed measure of the disturbance impulses is provided by a reference voltage $U_2$. Since the disturbance impulses are of a statistical nature, the comparator $K_1$ requires a storage battery or energizer S1, in which there is generated by the inflowing disturbance impulses, a sufficiently slowly varying voltage $U_3$ which is suitable for the desired regulating sequence. From a voltage comparison of $U_2$ and $U_3$, the comparator $K_1$ obtains a regulating voltage $U_4$ which, by means of known apparatus of this art, is directly employed for the regulation of the sensitivity and/or of the amplification. Herein, depending upon the type of light-sensitive element, either the light-sensitive element or the amplifier, or both, are regulated. The regulation of the light-sensitive elements is designated as sensitivity regulation, and the regulation of the amplifier as amplifying regulation.

The above-mentioned method regulates relatively slowly, since most of the interference signals are suppressed in the switch arrangement N, so as to render available only relatively few disturbance impulses for generating the regulating voltage $U_3$ in accumulator $S_1$. The foregoing requires a lengthy energy accumulating time. At some applications the distubances vary rapidly, for example, during the observation of ground terrain from an aircraft, or at the rapid oscillation of the optical system over a terrain having large distinctions in the stray light or in the light intensity of the background. At that time, the regulating speed of the comparator $K_1$ becomes insufficient due to the necessarily lengthy time constants of the accumulator $S_1$. The present invention accordingly, has the object to facilitate an accelerated regulation and thereby to extensively maintain the concurrent long-durational regulation of the above-described type.

The foregoing task is inventively solved in that, in addition to the above-mentioned regulating sequence, there is provided a second regulating sequence. This sequence, as shown in FIG. 1, is provided through an additional comparator $K_2$ into which there is conducted the previously mentioned regulating voltage $U_4$ as a reference voltage. The output voltages of the amplifier output are conveyed to the comparator $K_2$ and there, through the energy stored in the storage battery $S_2$, converted into a voltage $U_5$ suitable for an accelerated regulation. The generating of the regulating voltage $U_5$ in $K_2$ by means of the storage battery $S_2$ may be considerably more rapidly effected than the regulating through the accumulator $S_1$, since directly at the amplifier output there are available more disturbance impulses for each unit of time interval in comparison with downstream of the switching arrangement N, which prevents passage therethrough of largely most of the disturbance impulses. In accordance with this method there is attained a rapid regulation and, concurrently, the maintenance of the desired criteria, in that the number of disturbance impulses of the purified signal remain constant for a long period of time with only short-term deviations in the event of extremely rapid variations in the interference signals, but with smaller deviations and shorter duration of the deviations as compared to the absence of a second regulating circuit according to the invention.

In a particular embodiment of the invention, the storage battery $S_2$, due to the statistical character of the voltages conducted thereto, is an arrangement for the building-up of the effective level of the output voltage of the amplifier.

In a further embodiment of the invention, the effective voltage level builder is an approximately linear rectifier which, with the aid of a sequentially switched-in condensor and leakage resistance, forms in a known manner the arithmetic median value of the positive or negative momentary levels of the output voltage of the amplifier. It is known that such a median value-forming rectifier provides an output voltage for a statistically distributed voltage sequence and at correct dimensioning, which comes close to the effective level. Due to such rectifying diode, a few further advantageous properties of the arrangement become possible, and which are not possessed by various other effective level measures.

The regulating sequence is distributed to a certain extent in that in the output voltage of the amplifier there are also present the signal impulses in addition to the interference voltages or static. In the ideal case, the regulation should be independent of the signal impulses which occur in varying numbers and magnitudes. When the signal impulses are sufficiently infrequent and sufficiently low, then the regulation may be effected by means of the previously described method, without the signals measurably influencing the regulating sequence. In the event of stronger and more frequent signals, in accordance with a further embodiment of the invention further measures are applied, either individually or concurrently, in order to reduce or eliminate the influence of the light signals on the regulating sequence.

One of these measures lies in that the rectifying element, for example, the diode, is so connected, that impulses of the light signals occurring at the output of the amplifier direct the rectifier into its closed-direction (non-conductor), and thereby afford no addition to the direct current flow. Herein, there is used the known fact that impulse amplifiers for light signals are direct-current amplifiers which, for the purpose of the long durational maintaining constant of the operative point, include a low pass-feedback switching arrangement between the input and output of the amplifier, such as for example, the RC-switching arrangement A shown in FIG. 2 for the closed or actuated contact switches $S_1$ through $S_3$. The continually present disturbance impulses are so displaced by means of this low pass-feedback switching arrangement, wherein their timewise median value is almost zero, and the statistically occurring disturbance impulses have, at the amplifier output, the character of interference-alternating voltages. Contrastingly therewith, here appear the short-term and in relatively small number occurring impulses of the light signals, always in the form of direct-current impulses of equal polarity when the limiting frequency of the low pass-feedback is sufficiently low. The rectifier in the storage battery $S_2$ also equally rectifies in view of disturbance impulses, as an alternating voltage sequence, while it suppresses the direct-current impulse of the light signals, when these are conducted in the closure direction of the rectifier. The above-described sequence is, in a further embodiment of the invention supported, in that the rectifying switching in $S_2$, in a known manner, is so constructed as to have a high-pass character, in effect meaning that it, does not react at sufficiently slow, direct current-like sequences. In the simplest instance this occurs in that a high-pass filter is positioned between the output of the amplifier switching V and the input of the rectifier in $S_2$. This high-pass relationship additionally eliminates the need for direct-current voltage-like, low frequency components, and enhances the formation of alternating-current voltage-like, directable interference components. The limiting frequency of this high-pass relationship must lie above the limiting frequency of the amplifier when this high-pass is to produce additional effects which are not yet generated by the amplifier.

The light signals due to their impulse form contain basically a frequency mixture, within which there also contained frequencies which produce, in a known manner, low frequency disturbances in an amplifier with a high-pass character, which influence the stabilizing effect of the low-pass feedback A and generate interference voltages or static in the amplifier outut, and which also signally-dependent influence the rectifier in $S_2$. These disturbances may be very small when the light signals are sufficiently small and infrequent. In the event, however, that these disturbances are too large, and the point in time of the commencement of the light signals and the point in time of the discontinuance of the light signals are known, switches can be built in which switch-off all or part of the regulating circuits connected to the output of the amplifier for as long as disturbances are expected through the light signals. Such a switching-off does not disturb the regulating sequences since the time period of the switching-off is considerably less than the time constants of the switched-off regulating circuits. These possibilities are applicable when, for example, for an impulse laser — range finder the distances of the objects reflecting the laser light are located within known bounds.

Figure 2:
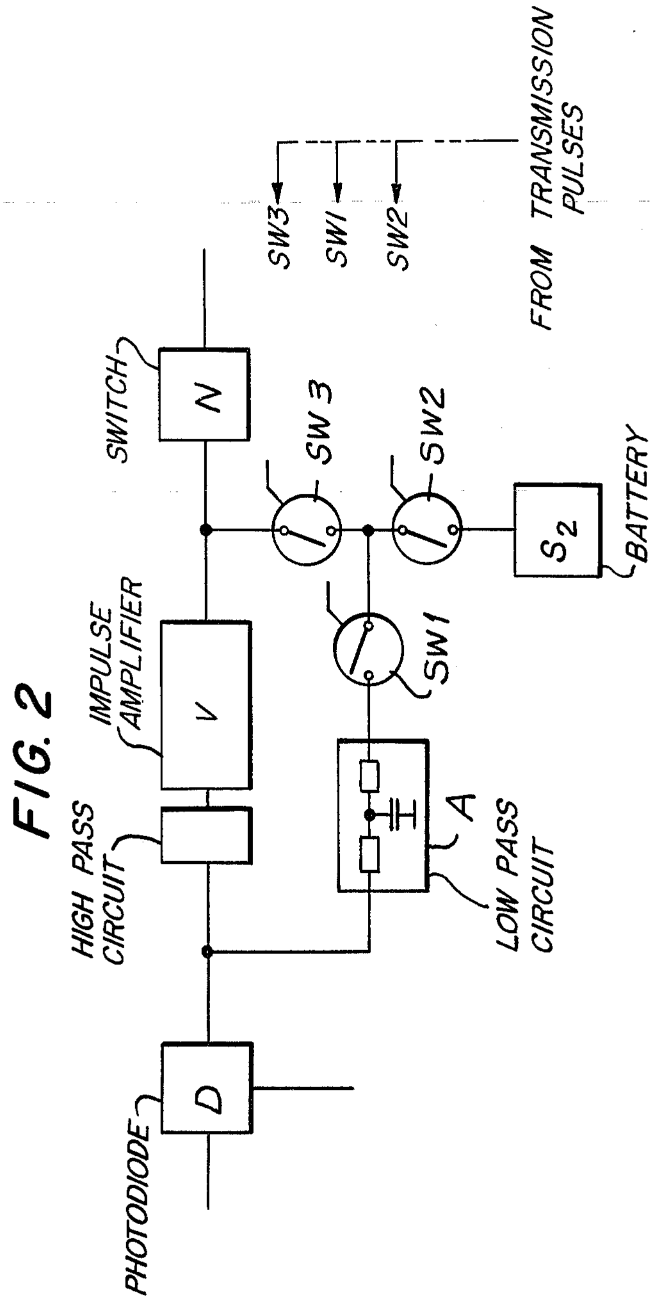
FIG. 2 is a block diagram of a switching arrangement utilized in the circuit of FIG. 1.

This provides the capability that the contact switch $SW_1$ as shown in FIG. 2 switches off the low-pass feedback A for the length of the mentioned time interval. The amplifier during this time interval acts as a direct-current amplifier with a substantially lower limiting frequency, and the mentioned disturbances through the low-frequency components of the light signal impulse become considerably lower.

Similarly there is provided the possibility that the storage battery $S_2$ may be switched off during the period of the appearance of possible disturbances of the light impulses, by means of the contact switch $SW_2$ shown in FIG. 2. Both switching-off capabilities may be concurrently employed when switching off the contact switch $S_3$ shown in FIG. 2.

The above-mentioned switches in a known manner are constructed, in view of the short switching periods, with the aid of electronic components (diodes, transistors). In the case of a laser-range finder, these switches are controlled by the transmission impulse.

While there has been shown what it considered to be the preferred embodiment of the invention, it will be obvious that modifications may be made which come within the scope of the disclosure of the specification.

What is claimed is:

1. A receiver for impulse-shaped light signals in which the time interval between successive light signals considerably exceeds the duration of the individual light signals, means for effecting a first regulating sequence comprising zero-point suppressing means for reducing interference voltages occurring at the output of the receiver, sensitivity regulating means and amplifying regulating means for imparting a predetermined magnitude to remaining disturbance impulses, and means for effecting a second accelerated regulating sequence in addition to said first regulating sequence, said last-mentioned means having a regulating voltage dependent upon the output voltages of said receiver preceding said zero-point suppressing means.

2. A receiver as claimed in claim 1, said means for effecting said first and second regulating sequences forming, respectively, first and second regulating voltages adapted to be combined into a single regulating voltage.

3. A receiver as claimed in claim 2, said combined regulating voltage being equal or proportional to the sum or difference between said first and second regulating voltages.

4. A receiver as claimed in claim 3, said means for effecting said second regulating sequence including a storage battery, said storage battery having an input receiving the output voltages of said receiver and forming a regulating voltage equal or proportional to the effective level of the output voltages of said receiver.

5. A receiver as claimed in claim 4, said storage battery including a rectifier and a condensor having a leakage resistance.

6. A receiver as claimed in claim 5, said rectifier being connected so as to be biased into a closed nonconductive relationship in response to the impulses of the light signals generated at the output of the receiver.

7. A receiver as claimed in claim 6, comprising light-sensitive means, and an impulse amplifier having high-pass properties, said rectifier switching being formed to have a high-pass characteristic and a lower limiting frequency above the frequency of said amplifier.

8. A receiver as claimed in claim 7, comprising a high-pass filter connected to the input of said rectifier for imparting said high-pass characteristic to the switching of said rectifier.

9. A receiver as claimed in claim 6, comprising low-pass circuit means connected intermediate the output and input of said amplifier for stabilizing the operative points thereof, and switch means for disconnecting said low-pass circuit means during the durations of said light signals.

10. A receiver as claimed in claim 6, comprising switch means for disconnecting said storage battery in said second regulating sequence means during periods of additive voltages generated in said amplifier by said light signals.

11. A receiver as claimed in claim 9, comprising switch means for jointly disconnecting the connections to said low-pass circuit means and to said storage battery in said second regulating sequence means during the duration of said light impulses.

12. A receiver as claimed in claim 9, said switch means comprising electronic switch means.

13. A receiver as claimed in claim 12, said electronic switch means including diodes.

14. A receiver as claimed in claim 12, said electronic switch means including transistors.

15. A receiver as claimed in claim 12, adapted for use in a laser-range finder, said switch means being actuated in response to transmission impulses.

* * * * *